United States Patent [19]

Naito et al.

[11] Patent Number: 5,405,756
[45] Date of Patent: Apr. 11, 1995

[54] TRANSPARENT ACID DRINK CONTAINING ACID-SOLUBLE CASEIN PHOSPHOPEPTIDE

[75] Inventors: Hiroshi Naito, Urawa; Tadashi Noguchi, Tokyo; Ryuichiro Sato, Tokyo; Keiko Tsuji, Tokyo; Hidemasa Hidaka, Urawa, all of Japan

[73] Assignee: Meiji Seika Kaisha, Ltd., Tokyo, Japan

[21] Appl. No.: 177,491

[22] Filed: Jan. 5, 1994

Related U.S. Application Data

[63] Continuation-in-part of Ser. No. 407,345, Sep. 14, 1989, abandoned, which is a continuation-in-part of Ser. No. 831,701, Feb. 21, 1986, abandoned, which is a continuation-in-part of Ser. No. 477,817, Mar. 22, 1983, abandoned.

[30] Foreign Application Priority Data

Mar. 30, 1992 [JP] Japan .................. 57-52639

[51] Int. Cl.$^6$ .............. C12P 21/06; C12P 21/00; A61K 37/16; C07K 03/12
[52] U.S. Cl. .................. 435/68.1; 435/272; 514/7; 426/590; 426/656
[58] Field of Search .............. 435/68.1, 272; 514/7

[56] References Cited

U.S. PATENT DOCUMENTS

| | | | |
|---|---|---|---|
| 2,149,306 | 3/1939 | Millar | 426/422 |
| 3,970,520 | 7/1976 | Feldman et al. | 426/34 |
| 4,075,195 | 2/1978 | Roland | 530/352 |
| 4,172,072 | 10/1979 | Ashmead | 435/272 |
| 4,293,583 | 10/1981 | Farr et al. | 426/422 |
| 4,358,465 | 11/1982 | Brule et al. | 435/69 |
| 4,361,587 | 11/1982 | Brule et al. | 426/42 |
| 4,495,176 | 1/1985 | Brule et al. | 424/128 |
| 4,740,462 | 4/1988 | Brule et al. | 435/69 |
| 4,777,243 | 10/1988 | Jolles et al. | 514/7 |

FOREIGN PATENT DOCUMENTS

| | | | |
|---|---|---|---|
| 0033686 | 8/1981 | European Pat. Off. | 426/42 |
| 2755709 | 6/1978 | Germany | 426/74 |

OTHER PUBLICATIONS

Peterson, R. F. et al., "The Separation and Amino Acid Composition of a Pure Phosphopeptone Prepared from B–Caselii by the Action of Trypsin", *J. of American Chemical Society*, vol. 80, 1958, pp. 95–99.

Webb et al., *Fundamentals of Dairy Chemistry*, AVI Publ. Co, Westport, Conn., 1965, pp. 506–524, 530–534 & 582–584.

*Primary Examiner*—Marian Knode
*Attorney, Agent, or Firm*—Keck, Mahin & Cate

[57] ABSTRACT

A transparent storage stable acidic beverage or other alimentary product containing casein phosphopeptide is obtained by reacting casein with trypsin, precipitating insoluble components at acid pH, adding a divalent cation such as calcium to the reaction medium, recovering the reaction product, and adding the casein phosphopeptide to a mixture to produce a beverage or product having beneficial solubilizing effects on calcium.

7 Claims, No Drawings

TRANSPARENT ACID DRINK CONTAINING ACID-SOLUBLE CASEIN PHOSPHOPEPTIDE

This application is a continuation in part of patent application Ser. No. 07/407,345, filed Sep. 14, 1989, which is a continuation in part of patent application Ser. No. 06/831,701, filed Feb. 21, 1986, which is a continuation in part of patent application Ser. No. 06/477,817 filed Mar.22, 1983, now abandoned.

FIELD OF THE INVENTION

This invention relates to a transparent, storage stable, acidic alimentary product, such as a beverage, containing a casein phosphopeptide (CPP), and to a method for preparing such a product. The invention allows for increased absorption of calcium and resulting health benefits from a pleasing beverage.

BACKGROUND OF THE INVENTION

Milk is well known as a balanced nutrient, and one of the best sources of calcium. Calcium is the most abundant metal in the mammalian body, is absorbed by humans and other mammals in the formation of bones and teeth, and is involved in various metabolic reactions in the body. The beneficial effects of milk are due not only to the calcium content, but also to the high efficacy or utilization of the calcium in terms of the ability of milk calcium to be digested and absorbed. These characteristics are attributable to lactose, calcium-binding protein, and casein.

Calcium absorption occurs both by active transport in the upper part of the small intestine, regulated by vitamin D and hormones, and by passive transport in the lower part of the small intestine. Naito, H. A., *Chemistry and Biology* 18,554–558 (1980). It is widely accepted that calcium should be solubilized to be absorbed by the small intestine.

It has been suggested that a phosphopeptide produced when casein is digested by pancreatic enzymes, particularly trypsin, solublizes calcium in the small intestine, thus increasing the amount of soluble calcium and working to enhance calcium absorption. Naito, H. A. et al., *Agricultural and Biolog. Chem.* 36, 409–415 (1972); and Lee, Y. S. et al., *British J. Nutrition* 43, 457–467 (1980). The peptide is referred to as casein phosphopeptide or CPP and may be derived from $\beta$- or $\alpha$- casein. The structures and some characteristics of the CPPs are shown in Table I. $\beta$-CPP has been studied by Manson, A. et al., *Archives of Biochem. and Biophysics* 145, 16–26 (1971). The molecular weight and some data for $\alpha$-CPP is estimated from the reference. It is apparent that CPP preparations can be heterogeneous, and CPP may be further digested as compared to the data in the table.

TABLE 1

| | $\alpha$-cpp | $\beta$-cpp |
|---|---|---|
| Molecular Weight | about 4,552 | about 3,123 |
| Structure | H$_2$N.AsP—Ile—Gly—Ser$^P$—Glu—Ser$^P$—Thr—Glu—Asp—Gln—Ala—Met—Glu—Asp—Ile—Lys—Gln—Met—Glu—Ala—Glu—Ser$^P$—Ile—Ser—Ser$^P$—Ser$^P$—Glu—Glu—Ile—Val—Pro—Asn—Ser$^P$—Val—Glu—Gln—Lys.COOH | H$_2$N.Arg—Glu—Leu—Glu—Glu—Leu—Asn—Val—Pro—Gly—Glu—Ile—Val—Glu—Ser$^P$—Leu—Ser$^P$—Glu—Glu—Ser—Ile—Thr—Arg.COOH |

TABLE 1-continued

| | $\alpha$-cpp | $\beta$-cpp |
|---|---|---|
| Number of phosphoric acid residues | 6 | 4 |
| N/P atomic ratio | 7.2 | 8 |
| Number of Carboxyl residues | 12 | 7 |
| Isoelectric point | pH 1-2 | pH 1-2 |

In a prior art method, casein is hydrolyzed with a crystalline trypsin to produce CPP, after which the reaction mixture is adjusted to a pH value of 4.5–5.0 to eliminate the unreacted casein and part of the impurities by 5 precipitation, followed by addition to the supernatant of barium chloride and ethanol (to the final concentration of 50 v/v %) to precipitate and recover CPP. R. F. Peterson, L. W. Nouman and T. L. McMeekin, *Journal of the American Chemical Society*, 80, 95–99 (1958).

The CPP of Peterson is not acceptable for a beverage because barium chloride is not an approved food additive, in contrast to calcium chloride. CRC Handbook of Food Additives (2d Ed. 1972), pp. 798–799, 808–809. To similar effect is Mellander, "On chemical and nutritional differences between casein from human and from cow's milk," Upsala Lakareforenings Forhandlingar pp. 182–195 (1947). There, preparations of CPP, including calcium salts, are prepared with toxic substances such as lead acetate that are not acceptable in food products.

Alternatively, CPP produced by hydrolysis of casein with a crystalline trypsin may be fractionated and separated by ultrafiltration or chromatographic techniques such as gel permeation chromatography or ion-exchange chromatography. Brule et al., U.S. Pat. No. 4,740,462. The Brule method uses a plurality of enzymes and produces a preparation with smaller CPP peptides with molecular weights predicted to be generally below 2500 daltons. The ultrafiltration and chromatography methods of Brule and others may have some research utility, but are not as suitable or economical on an industrial scale as precipitation methods such as according to the invention.

The characteristics of the CPP preparation produced by each method differ, in terms of e.g. molecular weight, nitrogen/phosphorous ratio, and purity.

Prior art preparations of CPP have had some use in solid foods and opaque beverages such as milk, natural fruit juice, canned juice and canned coffee. However, it has not been possible to prepare a storage stable transparent acid drink containing a pure preparation of CPP.

The following requirements are called for in a transparent acid drink. First, when raw materials used in the acid drink are mixed, dissolved, heat-sterilized and cooled, the resulting mixed solution must be completely transparent. Next, the transparent appearance of the mixed solution must be maintained even during storage. Generally, when prior art CPP is added to an acidic drink (pH 2.0–4.0) followed by mixing, dissolving, pH adjustment, heat sterilization and cooling, a precipitate or sediment forms, causing the drink to become turbid and to lose its transparency.

SUMMARY OF THE INVENTION

It is therefore an object of this invention to provide a transparent storage stable acidic alimentary product such as a beverage with digestible calcium complexed with acid-soluble CPP, and a process for preparing such a beverage or product. Another object of this invention is to provide an acid-soluble CPP that can be used with a transparent acid drink.

The beverage of the invention is an aqueous solution with a pH in the range of about 2.0 to 4.5, comprising an acid-soluble CPP and calcium, that remains without substantial turbidity for at least a week at room temperature. The beverage may contain flavoring, sweetening, and coloring agents.

Acid treatment according to the invention is an effective method for recovering a calcium complex of casein phosphopeptide from the standpoint of industrial production. According to the invention, CPP for a transparent acid drink is obtained by pretreating a CPP with acidity, removing all portions precipitated in the acid region, adjusting the pH of an acidic soluble fraction, adding calcium chloride and ethanol to the solution thereby forming the precipitate of a CPP, and drying the precipitate after separation.

Thus, a method of the invention comprises (a) digesting casein with 0.001%–2% (w/w) trypsin at a substantially neutral pH to produce a crude CPP, (b) reducing the pH to about 4.0 to 5.5, preferably about 4.5, to induce formation of a first precipitate, and removing the precipitate from the supernatant, (c) adjusting the pH to about 2.0 to about 4.0, preferably about 3.0, to form a second precipitate, and removing the second precipitate from the supernatant, (d) adjusting the pH of the supernatant to about 6.0, then adding calcium chloride and ethanol, to precipitate an acid-soluble calcium complex of CPP.

An alternative method comprises reducing the pH of the crude CPP to about 4.5 to form a precipitate which is removed, adjusting the pH of the supernatant to about 6.0, then adding calcium chloride and ethanol to precipitate an acid-soluble CPP complex with calcium.

The casein phosphopeptide-calcium complex is then added together with the other ingredients to the beverage mixture, which may include sugar, fructose-glucose liquid sugar, citric acid, flavors, and vitamin C as basic compounding ingredients, followed by mixing with water, dissolving, pH adjustment, filling, heat sterilization and cooling.

When the pH of a solution of the hydrolysis product obtained by digesting casein with trypsin is once adjusted to 4.6 with hydrochloric acid, giant molecules of casein protein are precipitated. When hydrochloric acid is added to the supernatant after the separation of the precipitate to adjust the pH to 3.0, the insoluble protein is precipitated and removed thereby yielding a peptide which is soluble at pH 3.0.

If the pH of the solution of the hydrolysis product obtained by the hydrolysis of casein with trypsin is adjusted to 3.0 with hydrochloric acid at the initial stage, the solution of the hydrolysis product may bring about gelation which leads to a state where the precipitate cannot as easily be separated.

The inventors studied whether calcium-solubilizing activity by CPP produced in vivo in the small intestine, as noted above, is shared by CPP produced in vitro. It turns out that the CPP prepared in vitro has a significant solubilizing activity of calcium.

According to this finding, the health drink of the invention has a superior enhancing effect on calcium absorption from food, because calcium may be absorbed by the body in the form of a solubilized calcium. This is a significant improvement in digestion and absorption of calcium which is otherwise possible only in a limited number of foods such as milk. Milk is not a good nutritional alternative for many, by reason of taste or e.g. lactose intolerance. The acid-soluble CPP of the invention is a good calcium source for such people.

Acid-soluble CPP according to the invention is a mixture of $\alpha$-CPP and $\beta$-CPP forming essentially no turbidity in solution at acid pH, preferably at pH of 3.0 or less, and having purity greater than about 80%, preferably greater than 90%, molecular weight between about 2500 and 4600 daltons, and the ability to solubilize at least 100 ppm calcium at a concentration of 0.5 mg/ml CPP.

The acid-soluble CPP produced in vitro according to the invention also has a solubilizing capability on iron and can increase iron absorption. It is widely believed that iron must be solubilized in order for it to be absorbed through the small intestine. Accordingly, the health drink of the invention may also enhance the absorption of solubilized iron by the human body. Previously this has been possible efficiently in a limited number of foods and drinks, such as heme or meat products. Similarly, magnesium may be solubilized in a drink or edible product of the invention.

DETAILED DESCRIPTION OF THE INVENTION

The present inventors have studied new methods of formulating beverages with calcium complexes of acid-soluble CPP. As a result, it was found that CPP may be recovered by precipitation at a high purity by using a metal ion other than barium chloride, such as calcium, iron or magnesium and, where necessary, by using a hydrophilic solvent. Use of calcium or iron ion is industrially advantageous because the produced CPP may be added to food or drink without removing the calcium or iron. Preparing CPP by precipitation is also a practical technique for large scale production.

By "high purity" or "purified" or "refined" or "substantially purified" is meant throughout this disclosure as purity above about 50%, preferably above about 80%, and most preferably above about 90%.

The casein starting material may be sodium caseinate, calcium caseinate, lactic casein, $\alpha$-casein, $\beta$-casein, or mixtures thereof.

The inventors have also studied methods of eliminating the bitter taste of casein hydrolysate. It was found that the bitter taste may be effectively eliminated by passing the hydrolysate through a column containing activated carbon or ion-exchange resin, without substantial impairment of CPP.

Although CPP is decomposed to a certain extent by digestive enzymes when taken in orally, a considerable amount of it is maintained intact and, as a result, calcium is kept almost completely solubilized. Acid-soluble CPP employed in the invention inhibits precipitation of calcium and keeps the calcium in a solubilized state, almost 100% at a pH value of 7 or 8. At pH in the acid range, solubility remains high enough to avoid turbidity.

Production of CPP and solubilization of calcium by CPP according to the invention will be shown by the following Examples, which are not intended to limit the scope of the invention as defined in the claims. All parts and percentages throughout this disclosure are by weight unless otherwise specified.

Example 1

20 kg of sodium caseinate, produced in New Zealand, were dissolved in water to give a 20% aqueous solution having a pH value of 8.0. A crystalline porcine trypsin (Novo, Denmark) was added to the solution in an amount of 0.5%, based on the substrate, then the mixture was allowed to react at 50° C. at a pH value of 7.0–8.5 for 30 minutes. At the end of the period, the reaction mixture was immediately adjusted to a pH value of 4.5 to produce a white precipitate, which was removed by centrifugation.

Calcium chloride and ethanol were added to the supernatant to final concentrations of 2.0% and 50 v/v %, respectively, then the mixture was stirred and allowed to stand overnight at ambient temperature. The supernatant was discarded by decantation and the CPP fraction was recovered with a basket type centrifugal machine. The precipitate was washed, in turn, with a 50% ethanol and then ethanol and dried by hot air, to give 3.4 kg of the CPP fraction. This contained 4.5% of water and the N/P atomic ratio was 15.5. The purity, as determined by high pressure liquid chromatography, was 80%.

Example 2

0.5% of crystalline trypsin, based on the substrate, was added to a 2% solution of lactic casein (pH 8.0), and the mixture was allowed to react at 50° C. at a pH value of 7.0–8.5 for 30 minutes. At the end of the period, the reaction mixture was immediately adjusted to a pH value of 5 and the precipitate produced was removed. 0.1% of calcium acetate and 50% of ethanol were added to the supernatant to precipitate CPP, which was recovered by centrifugation and washed with ethanol to give the desired product. The N/P atomic ratio of the CPP was 9.0 and it contained 3.5% of calcium. The purity, as determined by high pressure liquid chromatography, was 90% or higher.

Example 3

Crystalline trypsin was added to a 10% aqueous solution of lactic casein (pH 8.0) in an amount of 0.01%, based on the substrate, then the mixture was allowed to react at 50° C. at a pH value of 7.8–8.2 for 6 hours. At the end of the period, the reaction mixture was adjusted to a pH value of 4.5, then the resulting precipitate was removed immediately.

Ferric chloride was added to the supernatant to a concentration of 20 mM to precipitate CPP, which was recovered by centrifugation in a yield of 17.1%.

The CPP had the N/P atomic ratio of 13.0 and contained 3.5% of iron. The purity of CPP, as determined by high pressure liquid chromatography, was 85%.

Example 4

The supernatant containing 7.5% of the solid, obtained by isoelectric point sedimentation in Example 3, was passed through a column (3 cm × 30 cm) containing Dowex HCR-W2 (Tradename, 20–50 mesh, acid form) at a rate of 0.5 SV. The eluate was fractionated every 200 ml. A bitter taste was detected after elution of 2.4 1, at which the elution was stopped and the whole eluate was recovered and lyophilized. The CPP, which was almost free from bitter taste and had a N/P atomic ratio of 19.5, was recovered in a yield of nearly 100%.

The purity of CPP, as determined by high pressure liquid chromatography, was 50.3%.

Example 5

Calcium-solubilizing activity was determined by using CPP obtained by Example 2.

0.5 ml of a conventional 5 mg/ml CPP solution and 0.5 ml of a 10 mM aqueous calcium chloride solution were mixed, and 1.0 ml of a 20 mM phosphate buffer solution, to prepare a 1.25 mg/ml CPP solution. The pH was adjusted to a value of 7 or 8, was added, then the whole mixture was maintained at 25° C. for 6 hours. At the end of the period, calcium phosphate precipitate was eliminated by centrifugation, then 0.1N hydrochloric acid was added to the supernatant to prevent further formation of precipitate. The calcium concentration in the supernatant was measured by atomic absorption analysis to determine the remaining solubilized calcium. A similar test was conducted as a control, but using distilled water in place of CPP solution. The results are shown in Table 2.

Calcium-solubilizing power is 100% when all calcium from the calcium chloride solution remains in solution; calcium-solubilizing power of 0% means all the calcium precipitates.

TABLE 2

| Sample | pH 7.0 | pH 8.0 |
| --- | --- | --- |
| CPP Solution | 105% | 96% |
| Control | ≦10% | ≦10% |

It is evident from the above results that CPP produced in vitro exhibits a good calcium-solubilizing activity.

Example 6

1 ml of a 50 mg/ml conventional CPP solution obtained by Example 2 was mixed with 9 ml of an artificial gastric or enteric juice (according to Japanese Pharmacopoeia, 7th revised edition), then the mixture was maintained at 40° C. for hours or 6 hours, respectively. After the treatment, pepsin and pancreatin in the juices were deactivated with boiling water. After centrifugation of the mixture, CPP remaining in the supernatant was measured by high pressure liquid chromatography to determine the remaining rate. The calcium-solubilizing activity was also measured by using 0.5 ml of CPP remaining in the supernatant in a procedure similar to that in Example 5 at a pH value of 8. The results are shown in Table 3.

TABLE 3

| Sample | Remaining cpp | Remaining solubilized calcium |
| --- | --- | --- |
| non-treated cpp | 100% | 101% |
| cpp treated with artificial gastric juice | 65% | 99% |
| cpp treated with artificial enteric juice | 60% | 98% |
| artificial gastric juice | — | ≦10% |
| artificial enteric juice | — | ≦10% |
| control (distilled water) | — | ≦10% |

Example 7

A method to produce acid-soluble CPP in a two-step acid treatment according to the present invention is explained below.

1.7 liter of city water was added to 300 g of acid casein (water content: 11.7%) manufactured in New Zealand, followed by mixing and dissolving. Then 40% caustic soda solution was added thereby adjusting the pH to 7.0. Crystallized pig trypsin (manufactured by Novo Co., Ltd.) of an amount of 0.01% based on the amount of the substrate was added to the solution, followed by enzyme reaction at pH 6.0–7.0 and 60 degrees C. for one hour. Immediately thereafter, the pH was adjusted to 4.5 with 35% hydrochloric acid. The precipitate formed was separated using a centrifugal separator to yield a supernatant and a precipitate. 35% hydrochloric acid was added again to the supernatant thereby adjusting the pH to 3.0. After permitting to stand for 16 hours at room temperature, the solution was centrifuged to obtain a supernatant and a precipitate. 40% alkali solution was added to the supernatant thereby adjusting the pH to 6.0. To the resulting solution was added calcium chloride of an amount of 0.7% based on the amount of the solution and ethanol in an amount corresponding to a final concentration of 50% (v/v). After stirring, the solution was permitted to stand for 16 hours at room temperature followed by recovery of an acid-soluble CPP fraction using a centrifugal separator. The precipitate was then washed with 50% ethanol and separated. Washing was conducted a total of three times followed by drying to yield 30 g of purified acid-soluble CPP.

The starting material or casein employed in the method is preferably in the form of acidic casein, sodium caseinate or calcium caseinate. However, milk or skimmed milk which are still impure may also be used as the starting material. According to the method, casein, the starting material, is dissolved in water and then contacted with trypsin or an enzyme preparation containing trypsin. Trypsin or an enzyme preparation containing trypsin may be commercially available pancreatin, although a crystalline grade is more preferable in view of considerations such as yield.

CPP may be produced by reacting the starting material, or casein, with an enzyme as mentioned above. From a practical point of view, concentration of casein should be between 2–30%. The pH value should be from 6.0 to 9.0. The temperature at which the reaction is performed should be kept between 15°–60° C., preferably 20°–50° C.

The weight ratio of enzyme to casein substrate should normally be 0.001–2%, when calculated as crystalline trypsin. They are contacted for from 5 minutes to 100 hours, during which the reaction will produce CPP. Other digestive enzymes may also be appropriate.

Recovery of CPP thus produced may be performed by the addition of a calcium salt (such as calcium chloride or calcium acetate) and a hydrophilic solvent to the reaction mixture. In the recovery step, the pH value should be maintained at or below 10, since elimination of phosphoric acid from CPP will occur at a higher pH value. Conversely, the reaction at a pH value of below 5.5 will give rise to formation of a precipitate, which must be removed before precipitation of CPP. The reaction at a pH value of below 3 will cause a simultaneous precipitation of CPP, hence it should be avoided. In summary, the entire reaction should preferably be performed at a pH value range of 3–10.

Calcium is normally added in the range of 0.01–10%, within which no significant difference is observed.

The hydrophilic solvent to be used for precipitation includes, for example, methanol, ethanol, propanol, isopropanol, butanol and acetone. Ethanol is most preferred. It should be added to attain a final concentration of 30–80 v/v %.

Isolation of CPP precipitate thus obtained may be performed by conventional means, such as decantation, filtration or centrifugation. It may be further purified by washing it with a solvent employed for the recovery.

The thus isolated CPP precipitate can be dried by conventional means (such as by hot air, fluidized bed drying or vacuum drying) to give a white to pale yellow powder having no odor and almost no taste.

The purity of CPP thus obtained may be assayed through the determination of nitrogen content by Kjeldahl method and of phosphorus content by Allen's method and modified Nakamura's method, then calculation of N/P atomic ratio.

The CPP has an N/P atomic ratio of 7–20. It is almost free from the bitter taste which is peculiar to decomposition products of casein, hence may be used for food and drink as is.

The CPP contains almost no aromatic amino acids, hence it shows almost no ultraviolet absorption assigned thereto (e.g. 280 nm) but only shows absorption assigned to peptide bonds (205–220 nm).

The CPP may be alternatively assayed by high pressure liquid chromatography, using, for example, TSK-GEL, G-2000 SW (Tradename, Toyo Soda Manufacturing Co., Ltd.), eluted with a 0.1M phosphate buffer solution (pH 6.5, containing 0.1M sodium chloride).

Detection of CPP may be performed by the measurement of ultraviolet absorption at 215 nm. According to assay by this method, it was confirmed that the CPP obtained by the process of the invention contains two types of CPP which are presumably originated from $\alpha$-CPP and $\beta$-CPP and that the content of CPP is higher than 50%, preferably higher than 90%.

Example 8

Following the method of example 7, ferric ions may be added to the hydrolysate solution containing CPP to recover CPP. Where CPP is recovered by using iron, the iron should be kept in the form of ferric ion such as ferric chloride or ferric citrate. In this case, CPP can be recovered without using any organic solvent.

Iron should be preferably added in the range of 0.01–1%, based on the reaction mixture. The temperature at which recovery of CPP is performed is not critical. Therefore, recovery may be performed at any temperature at which no boiling of the solvent takes place, although slightly higher yield can be obtained by keeping the temperature relatively low.

Example 9

CPP hydrolysate, intermediate products, or acid-soluble CPP may be further purified by active carbon filtration or column chromatography to remove any bitter taste. A hydrolysate solution of casein with trypsin is passed through a column containing activated carbon or a cation-exchange resin. It is preferable to remove part of the impurities by isoelectric point sedimentation at pH 3–5.5, in advance of subjecting the hydrolysate to column chromatography. Upon chromatography, the hydrolysate is preferably passed through a column at a rate of 0.2–2.0 SV and at a concentration of 2–15%. By this method, 1.0–2.0 kg of the product (calculated as the starting casein) may be treated with about a 1 l column. This method is disadvantageous from the standpoint of industrial production.

Example 10

Refreshing Transparent Acid Drink Containing Casein Phosphopeptide (CPP):

The CPP of the invention resulting from a two-step acid precipitation as disclosed in Example 7 was used in a transparent beverage. The pH of basic compounding ingredients shown in Table 4 was adjusted to 3.0 using a solution of citric acid. After homogeneous mixing, the resulting solution was heated to 80 degrees C., followed by deaeration. After filling the solution into a bottle, the bottle was capped, followed by heat sterilization for 20 minutes at 83 degrees C. and cooling. The control was compounding ingredients in which CPP from a one-step process such as example 2 was mixed for the purpose of comparison.

Turbidity of 0.5% solution was measured and is shown in Table 5.

After the preparation of the sample, the sample was stored for a week at room temperature and apparent turbidity was observed. The results were summarized in Table 6.

TABLE 4

| Compounding ingredients of the refreshing drink | |
| --- | --- |
| Raw Material | Compounding Ratio (%) |
| Sugar | 7.0 |
| Fructose-glucose liquid sugar | 5.0 |
| Citric acid | 0.3 |
| Calcium carbonate | 0.5 |
| Perfume | 0.1 |
| Vitamin C | 0.1 |
| Acid-soluble CPP* | 0.4 |
| Water | 86.6 |
| | 100.00 |

*As a control, 0.4% of the conventional CPP of Examples 1-2 was used. All other conditions were the same as for the acid-soluble CPP of the present invention.

TABLE 5

| Sample | Turbidity (660 nm) | | Apparent Turbidity | |
| --- | --- | --- | --- | --- |
| | pH 3.0 | pH 7.0 | pH 3.0 | pH 7.0 |
| CPP from two-step precipitation | 0.115 | 0.011 | (−) | (−) |
| CPP from single precipitation | 0.531 | 0.304 | (++) | (+) |

Turbidity was determined at an absorption value of 660 nm using a UV-160 type spectrophotometer manufactured by Shimazu Seisakusho Co., Ltd. Further, criteria for evaluation of apparent turbidity based on observation with the naked eye are as follows:

(−): Turbidity is never observed and transparency is very high.

(++): The presence of turbidity is remarkably observed and the amount is extremely large.

(+): The presence of turbidity is clearly observed and the amount is considerably large.

TABLE 6

| Observation of turbidity in the refreshing drink sample during storage | | | | | | | |
| --- | --- | --- | --- | --- | --- | --- | --- |
| | Days of Storage | | | | | | |
| Sample | 1 | 2 | 3 | 4 | 5 | 6 | 7 |
| Refreshing drink with CPP from two-step precipitation | (−) | (−) | (−) | (−) | (−) | (−) | (−) |
| Control beverage | (+) | (+) | (+) | (+) | (+) | (+) | (+) |

Example 11

Carbonated Drink Containing Casein Phosphopeptide (CPP) for Transparent Acid Drink:

To basic compounding ingredients shown in Table 7 was added the same amount of carbonated water, and a sample was prepared in a similar manner as in Example 10. Using the sample, a storage test was carried out at room temperature for a week. As a result, transparent appearance was maintained and no turbidity was formed in a carbonated drink in which the casein phosphopeptide (CPP) from a two-step precipitation prepared by the process of the present invention was used.

TABLE 7

| Compounding ingredients of the carbonated drink | |
| --- | --- |
| Raw Material | Compounding Ratio (%) |
| Fructose-glucose liquid sugar | 29.3 |
| Citric acid | 0.6 |
| Calcium carbonate | 1.0 |
| Perfume | 0.2 |
| Vitamin C | 0.2 |
| Casein Phosphopeptide (CPP) of the present invention | 0.8 |
| Water | 67.9 |

CPP may be added either to raw materials or to final products directly. It may be used in acidic transparent beverages or other appropriate alimentary products and foodstuffs such as aspics, jellies, syrups, concentrates, or powders for preparing beverages. Compounding ingredients in these cases would include thickeners, gelling agents or other appropriate substances known in the art of food preparation. There is no theoretical limit to the amount of CPP to be added to the foodstuff, as it has no bitter taste or odor peculiar to casein and has no toxicity to humans. However, in view of various factors such as cost and solubility, it is preferably added, in the case of beverages, in an amount of 0.1%–10%, most preferably 0.5–6% to the final product.

Calcium and iron, or other bivalent cations contained in the food and drink obtained above, are believed to be maintained in a solubilized state by the chelating action of phosphoric group of phosphoserine and carboxy groups of acidic amino acids in the CPP. Thus, the calcium and iron are presented to the small intestine in a high concentration and are able to be absorbed.

The food and drink according to the present invention, therefore, increase absorption by the human body of calcium and iron in growing infants and children, and are good for the treatment of anemia in women, and bone diseases such as osteoporosis in aged people. They also have a healthy influence upon the metabolism of calcium and iron in the healthy humans.

Example 12

2.0 kg casein phosphopeptide produced by enzymatic degradation of casein with trypsin was dissolved in 11.3 l tap water at pH 7.0. A single acid precipitation was carried out by reducing the pH to 4.5 by adding 35%

HCl. A precipitate was produced upon ripening at 25° for 16 hrs, followed by centrifugation and filtration to remove the precipitate. The pH of the filtrate (supernatant) was adjusted to pH 6.0 with 40% NaOH.

58.8 g of $CaCl_2 \cdot 2H_2O$ were added to 4l of the above supernatant to bring the concentration to 100 mM. Precipitation occurred during ripening at 25° C. for 12 hrs. Centrifugation at 1000 rpm for 20 min. yielded a precipitate which was washed in 100% ethanol and centrifuged again at 1000 rpm for 20 min. The washed precipitate was dried under reduced pressure at 60° C. for 2 hrs, and crushed for further use.

The purity of the calcium-derived CPP was 86% as measured by conventional methods such as iron affinity HPLC or barium ethanol precipitation.

Example 13

The single precipitation method of Example 12 was followed, except 97.7 g of $BaCl_2 \cdot 2H_2O$ were substituted for the calcium salt. The purity of the barium-derived CPP was 75%

The absorbance characteristics of the products of examples 12 and 13 were analyzed.

The absorbance of solutions of the calcium-derived CPP was significantly less than that of solutions of barium-derived CPP, indicating a clearer solution. Thus, the CPP prepared with calcium is preferable in that it is transparent enough for use in a transparent acidic beverage, unlike the CPP prepared with barium.

Example 14

Several CPP preparations were obtained to compare their effectiveness in transparent acidic beverages. The preparations are described below; the results are shown in Table 8.

Preparation A was prepared as in example 7: Casein was contacted with trypsin at 50° C. for 30 min., followed by a two step acid precipitation. CPP was then recovered with calcium chloride and ethanol. The purity of CPP was 94%, and the yield was 10%. The CPP was soluble up to 1% at pH 2.5 and did not cause turbidity at pH as low as pH 2.0. This CPP allowed for high levels of soluble calcium at a CPP concentration of 0.5 mg/ml.

Preparation B is essentially that of Peterson, J. Am. Chem. Soc. 80, 95–99 (1958). β-casein is contacted with trypsin at 25° C. for 20 min., followed by two steps of acid precipitation and recovery of CPP by barium chloride and ethanol. The purity was only 79%, and the yield was only 5%. Solutions of this CPP were turbid at acid pH. Soluble calcium levels at CPP concentration of 0.5 mg/ml were comparable to that of preparation A. Prevention of precipitation of calcium, or calcium-solubilizing power was measured as in Example 5, with a 100 ppm (0.10 mg/ml) initial calcium concentration.

Preparation C is essentially that of Brule, U.S. Pat. No. 4,361,587. Casein is contacted with trypsin, chymotrypsin, and pancreatin at 37° C.–40° C. precipitated with calcium chloride, and then passed through two steps of ultrafiltration. Purity was only 19% and yield was 46%. Acidic solutions were not turbid, but the solubility of calcium was less than for preparation A.

TABLE 8

| Method | A. | B. | C. |
|---|---|---|---|
| Purity of CPP (%) | 94 | 79 | 19 |
| Yield (%) | 10 | 5 | 46 |
| Turbity (0.5%, 720 nm) | | | |
| pH 7.0 | 0.017 | 0.001 | 0.002 |
| pH 3.0 | 0.016 | not soluble | 0.005 |
| pH 2.5 | 0.015 | not soluble | 0.003 |
| pH 2.0 | 0.047 | not soluble | 0.003 |
| Molecular weight (referring to each document) | 2,500–4,000 (α-,β-CPP) | 4,000 | less than 10,000 |
| Prevention of precipitation of Ca Concentration of CPP (mg/ml) | Concentration of solution CA (ppm) | Concentration of solution CA (ppm) | Concentration of solution CA (ppm) |
| 0.1 | 35 | 62 | 24 |
| 0.2 | 95 | 116 | 31 |
| 0.5 | 123 | 121 | 39 |
| 1.0 | Not Done | 121 | 119 |

The CPP of the invention is thus advantageous because it has high purity, is clear at acid pH, employs calcium, (a valuable food additive), provides high calcium-solubilizing power, is well-tolerated by digestive enzymes in the stomach and intestines, and is storage stable.

Example 15

A transparent CPP-containing acid beverage was prepared with the formulation of Table 9.

TABLE 9

| Ingredients | Amount (%) |
|---|---|
| fructose-glucose liquid sugar (fructose: 42%) | 13.0 |
| transparent Japanese apricot juice | 2.0 |
| transparent apple juice (5-times condensed) | 0.4 |
| citric acid | 0.2 |
| calcium lactate | 0.38 |
| CPP (purity: more than 90%) | 0.025 |
| flavor (Japanese apricot) | 0.15 |
| coloring agent | 0.02 |
| water | 83.825 |
| Total | 100 |

These ingredients were mixed to obtain a satisfactory drink.

What is claimed is:

1. A method of preparing a transparent acidic alimentary product comprising a purified acid-soluble casein phosphopeptide (CPP) fraction and calcium, the product remaining without substantial turbidity for at least a week at room temperature, the method comprising:
   (a) digesting casein with 0.001%–2% (w/w) trypsin at a substantially neutral pH to produce a crude CPP,
   (b) reducing the pH to about 4.0 to about 5.0 to induce formation of a precipitate, and removing the precipitate from the supernatant,
   (c) reducing the pH of the supernatant obtained in step (b) to about 3.0 to induce formation of a precipitate, and removing the precipitate from the supernatant,
   (d) adjusting the pH of the supernatant obtained from step (c) to about 6.0, then adding calcium chloride and ethanol to precipitate an acid-soluble calcium complex of CPP,
   (e) formulating the alimentary product by mixing the CPP with water, adjusting the pH, filling packages, and sterilizing the product.

2. The method of claim 1, wherein the alimentary product is a beverage.

3. The method of claim 1 wherein the casein is selected from sodium caseinate, calcium caseinate, lactic casein, alpha-casein, beta-casein, and mixtures thereof.

4. The method of claim 1 comprising adding a sweetener, a flavorant, or a colorant to the CPP and water of step (e).

5. The transparent acidic alimentary product produced by the method of claim 1.

6. The transparent acidic alimentary product of claim 5 wherein said product is a beverage.

7. The transparent acidic alimentary product of claim 5 wherein said product is a concentrate.

* * * * *